(12) United States Patent
Fu et al.

(10) Patent No.: US 11,988,507 B1
(45) Date of Patent: May 21, 2024

(54) CALCULATION METHOD AND INSTALLATION MECHANISM FOR COMPRESSOR UNIT SINGLE METER ALIGNMENT PAD IRON ADJUSTMENT

(71) Applicant: CHINA NATIONAL CHEMICAL ENGINEERING THIRD CONSTRUCTION CO., LTD, Hefei (CN)

(72) Inventors: Jiahui Fu, Hefei (CN); Xinyu Pan, Hefei (CN); Chengkang Han, Hefei (CN); Ming'ao Wu, Hefei (CN); Guohua Cheng, Hefei (CN); Wenwei Li, Hefei (CN)

(73) Assignee: CHINA NATIONAL CHEMICAL ENGINEERING THIRD CONSTRUCTION CO., LTD, Hefei (CN)

( * ) Notice: Subject to any disclaimer, the term of this patent is extended or adjusted under 35 U.S.C. 154(b) by 0 days.

(21) Appl. No.: 18/530,712

(22) Filed: Dec. 6, 2023

Related U.S. Application Data

(63) Continuation of application No. PCT/CN2023/109277, filed on Jul. 26, 2023.

(30) Foreign Application Priority Data

Jan. 4, 2023 (CN) .......................... 202310005388.3

(51) Int. Cl.
*G01B 5/25* (2006.01)
(52) U.S. Cl.
CPC ...................... *G01B 5/25* (2013.01)
(58) Field of Classification Search
CPC .......................................................... G01B 5/25
See application file for complete search history.

(56) References Cited

U.S. PATENT DOCUMENTS

| 4,367,594 A | * | 1/1983 | Murray, Jr. | ............... | G01B 5/25 33/412 |
| 5,185,937 A | * | 2/1993 | Piety | ........................ | G01B 5/25 33/645 |

(Continued)

FOREIGN PATENT DOCUMENTS

| CN | 102990351 A | 3/2013 |
| CN | 203240975 U | * 10/2013 |

(Continued)

OTHER PUBLICATIONS

International Search Report issued in corresponding PCT Application No. PCT/CN2023/109277, dated Oct. 20, 2023.

(Continued)

*Primary Examiner* — Yaritza Guadalupe-McCall
(74) *Attorney, Agent, or Firm* — Westbridge IP LLC

(57) ABSTRACT

Disclosed are a calculation method and an installation mechanism for compressor unit single meter alignment pad iron adjustment. The installation mechanism includes: a bracket and a connecting piece installed on the bracket; and an installation piece arranged on an end portion of the bracket. The bracket is provided with an installation box, the installation box is internally and rotatably provided with a rolling rod, the rolling rod is winded with a connecting rope, one end, away from the rolling rod, of the connecting rope is provided with a fixing piece, one end of the rolling rod extends to an outer side of the installation box and is connected with a cam, the cam is provided with a groove, the installation box is provided with a limiting piece, one side, towards the cam, of the limiting piece is provided with an open slot.

6 Claims, 4 Drawing Sheets

(56) References Cited

U.S. PATENT DOCUMENTS

| | | | | |
|---|---|---|---|---|
| 8,584,372 | B2* | 11/2013 | Stoffel | G01B 5/25 33/832 |
| 8,607,560 | B2* | 12/2013 | Fiedler | F25B 9/14 29/888.06 |
| 8,955,230 | B2* | 2/2015 | Alexander | G01B 5/25 33/645 |
| 9,610,663 | B1* | 4/2017 | Goldberg | G01B 5/25 |
| 9,797,701 | B1* | 10/2017 | McBride | B25B 29/00 |
| 9,964,394 | B2* | 5/2018 | Andersson | G01B 5/25 |
| 10,150,192 | B1* | 12/2018 | Navarro, Sr. | B23Q 3/186 |
| 11,236,998 | B1* | 2/2022 | Winningham | G01B 5/24 |
| 11,255,654 | B2* | 2/2022 | Maegawa | B23Q 17/2216 |
| 2009/0217658 | A1* | 9/2009 | Fiedler | F25B 9/14 60/519 |

FOREIGN PATENT DOCUMENTS

| | | | |
|---|---|---|---|
| CN | 105127735 A | | 12/2015 |
| CN | 207930286 U | | 10/2018 |
| CN | 110091165 A | | 8/2019 |
| CN | 214276705 U | | 9/2021 |
| CN | 214470494 U | | 10/2021 |
| CN | 115971840 A | * | 4/2023 |
| CN | 115971840 A | | 4/2023 |
| JP | H0655385 A | | 3/1994 |

OTHER PUBLICATIONS

Written Opinion issued in corresponding PCT Application No. PCT/CN2023/109277, dated Oct. 20, 2023.

* cited by examiner

CALCULATION METHOD AND INSTALLATION MECHANISM FOR COMPRESSOR UNIT SINGLE METER ALIGNMENT PAD IRON ADJUSTMENT

CROSS-REFERENCE TO RELATED APPLICATIONS

This application is a continuation of International Application No. PCT/CN2023/109277, filed on January Jul. 26, 2023, which claims priority to Chinese Patent Application No. 202310005388.3, filed on Jan. 4, 2023. All of the aforementioned applications are incorporated herein by reference in their entireties.

TECHNICAL FIELD

The present application relates to the technical field of engineering mechanical device installation, in particular to a calculation method and an installation mechanism for compressor unit single meter alignment pad iron adjustment.

BACKGROUND

Compressor units, high-pressure pumps, and generator units are often used in fields such as chemical engineering and electric power. In many projects, a single meter is usually used for unit centering alignment. By continuously adjusting a thin pad iron on a foundation support to finally achieve the error range required by alignment errors, the unit is gradually adjusted. In this way, the speed is very slow, the efficiency is also very slow, and the construction period is very long.

SUMMARY

A purpose of the present application is to provide a calculation method and an installation mechanism for compressor unit single meter alignment pad iron adjustment, as to solve the problem of using the single meter for unit centering alignment provided in the background. By continuously adjusting the thin pad iron on the foundation support by the alignment errors, the unit is gradually adjusted. In this way, the speed is very slow, and the efficiency is also very slow.

In order to achieve the above purpose, the present application provides the following technical schemes: an installation mechanism for compressor unit single meter alignment pad iron adjustment, including: a bracket and a connecting piece installed on the bracket, and the installation mechanism further includes: an installation piece arranged on an end portion of the bracket; the installation piece is provided with a fixture for fixing a dial gauge; and the bracket is provided with an installation box, the installation box is internally and rotatably provided with a rolling rod, the rolling rod is winded with a connecting rope, one end, away from the rolling rod, of the connecting rope is provided with a fixing piece, the installation box is rotatably provided with a cam, one end of the rolling rod extends to an outer side of the installation box and is connected with the cam, the cam is provided with a groove, the installation box is provided with a limiting piece, one side, towards the cam, of the limiting piece is provided with an open slot, and the open slot is internally provided with a convex block for inserting into the groove.

As a preferred scheme, the open slot is internally provided with a touch switch, and the cam is provided with an indicator light electrically connected with the touch switch.

As a preferred scheme, the connecting rope is provided with an expansion rod, one end, away from the connecting rope, of the expansion rod is connected with the fixing piece, and the connecting rope is provided with a fixing mechanism for fixing the expansion rod.

As a preferred scheme, the fixture is provided with a first lens and a second lens.

As a preferred scheme, the bracket includes a support rod and a movable rod; and an end portion of the support rod is provided with an installation hole, the movable rod is slidably inserted into the installation hole, and the support rod is provided with a bolt for fixing the movable rod.

As a preferred scheme, the connecting piece includes two groups of installation blocks; and the two groups of the installation blocks are mutually clamped, and the bracket is thread-connected with a screw rod connected with one group of the installation blocks.

As a preferred scheme, a calculation method for compressor unit single meter alignment pad iron adjustment uses the installation mechanism for compressor unit single meter alignment pad iron adjustment, and the calculation method specifically includes the following steps.

S1: connecting pieces of two brackets are installed on an adjustment axis and a reference axis respectively, and then two dial gauges for measurement are respectively fixed on two installation pieces;

S2: a fixing piece is installed in a fixing area, the adjustment axis and the reference axis are rotated, the brackets are driven to be rotated together with an installation box, a connecting rope is released from an outer wall of a rolling rod, the rolling rod is driven to be rotated with a cam, so that a convex block is inserted into a groove, a numerical value on the dial gauge is read, and then it is continued to rotate the adjustment axis and the reference axis, so that the convex block is inserted into the groove again, a numerical value on the dial gauge is read;

S3: then the numerical value obtained is substituted into a calculation formula for calculation, a pad iron thickness to be adjusted is determined, and a pad iron is adjusted in place according to a numerical value calculated; and S4: after the pad iron is adjusted, the adjustment axis and the reference axis are rotated, and centering repeated measurement is performed again by using the dial gauge.

As a preferred scheme, the calculation formula in S3 is:

$$H_{front} = \frac{(a_3 - a_1 + b_3 - b_1) * (S + L_{front})}{2S} - \frac{b_3 - b_1}{2}$$

$$H_{rear} = \frac{(a_3 - a_1 + b_3 - b_1) * (S + L_{rear})}{2S} - \frac{b_3 - b_1}{2}$$

Herein, $H_{front}$ is a front anchor bolt of the adjustment axis, $H_{rear}$ is a rear anchor bolt of the adjustment axis, $L_{front}$ is a distance from an end face of the adjustment axis to a center of the front anchor bolt, $L_{rear}$ is a distance from the end face of the adjustment axis to a center of the rear anchor bolt, and S is a distance between the two axes, and is a set value.

Compared with existing technologies, the beneficial effects of the present application are that: in the present application, a traditional method and mode of adjusting a pad iron after single meter alignment is changed. After the error is measured, it is directly substituted into the calculation formula of the present application to calculate the pad iron thickness (increased or decreased) to be adjusted, and it may be adjusted in place, the time of repeated measurement and adjustment may be saved, the time is greatly saved and the efficiency is improved, thus a large amount of cost investment is saved.

DETAILED DESCRIPTION OF THE EMBODIMENTS

Technical schemes in embodiments of the present application are clearly and completely described below in combination with drawings in the embodiments of the present application. Apparently, the embodiments described are only a part of the embodiments of the present application, not all of the embodiments. Based on the embodiments in the present application, all other embodiments obtained by those of ordinary skill in the art without creative labor shall fall within the scope of protection of the present application.

Figure 1:
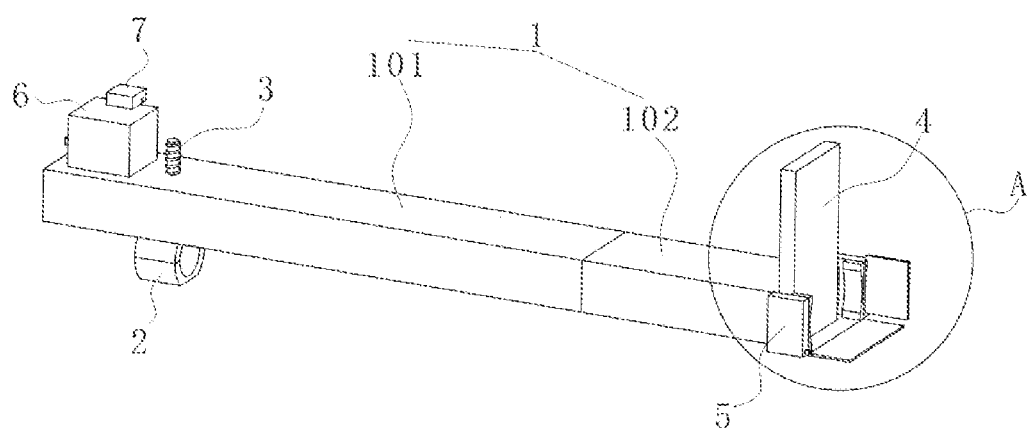
FIG. 1 is a structure schematic diagram of the present application.

Please refer to FIG. 1, an installation mechanism for compressor unit single meter alignment pad iron adjustment includes a bracket 1, a connecting piece 2 is installed on the bracket 1, and the connecting piece 2 is fixed on an axis (referring to an adjustment axis and a reference axis) of a compressor unit, a high-pressure pump, and a generator unit, thereby the bracket 1 is installed on the axis of the compressor unit, the high-pressure pump, and the generator unit; and an end portion of the bracket 1 is provided with an installation piece 4, and the installation piece 4 is provided with a fixture 5 for fixing a dial gauge.

Figure 3:
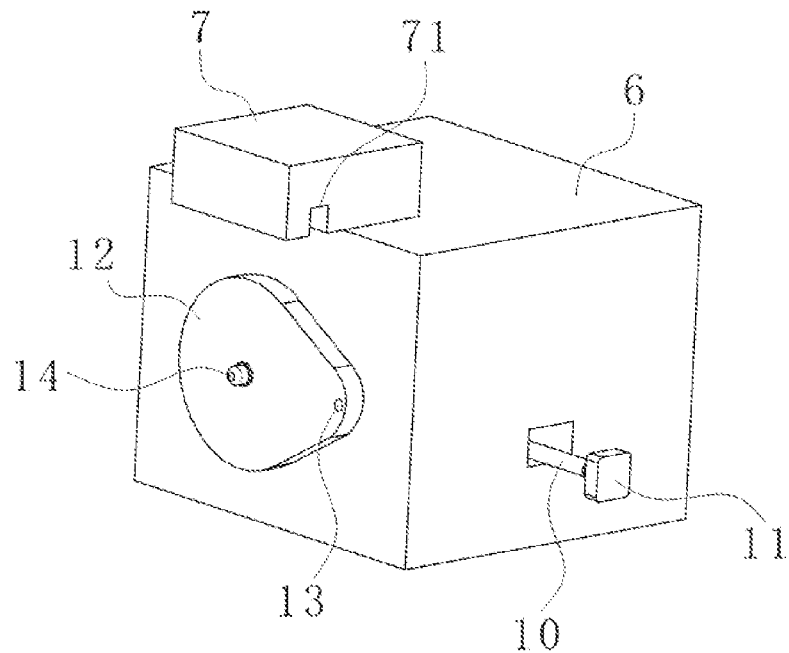
FIG. 3 is a schematic diagram of a connection structure between an installation box and a limiting piece of the present application.
Figure 4:
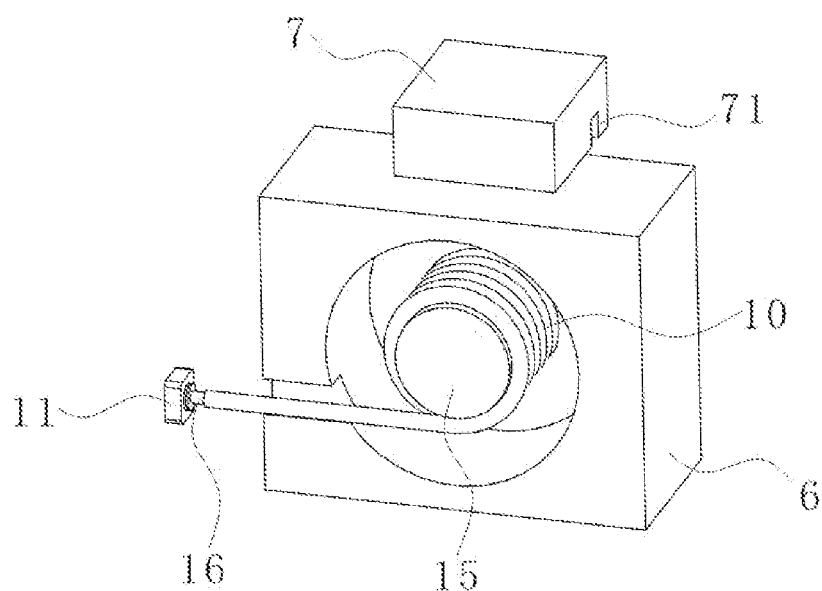
FIG. 4 is a schematic diagram of a connection structure between a rolling rod and a connecting rope of the present application.
Figure 6:
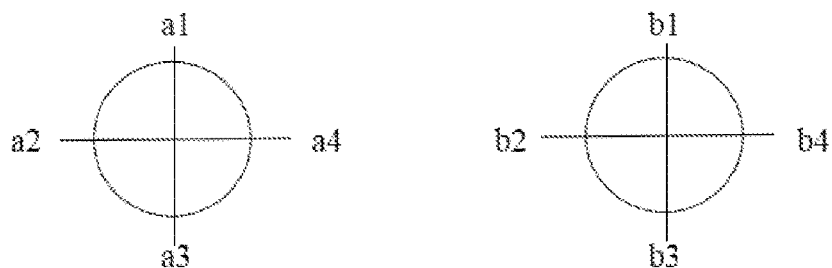
FIG. 6 is a schematic diagram of a measured value of the present application.

Please refer to FIG. 1, FIG. 3, and FIG. 4, the bracket 1 is provided with an installation box 6, the installation box 6 is internally and rotatably provided with a rolling rod 15, the rolling rod 15 is winded with a connecting rope 10, one end, away from the rolling rod 15, of the connecting rope 10 is provided with a fixing piece 11 (the fixing piece 11 may be a magnetic block or a clamp or the like, so that the fixing piece 11 may be connected to an installation area); the installation box 6 is rotatably provided with a cam 12, one end of the rolling rod 15 extends to an outer side of the installation box 6 and is connected with the cam 12; the cam 12 is provided with a groove 13, the installation box 6 is provided with a limiting piece 7, one side, towards the cam 12, of the limiting piece 7 is provided with an open slot 71, and the open slot 71 is internally provided with a convex block for inserting into the groove 13; the fixing piece 11 is fixed on the compressor unit, the high-pressure pump, the generator unit or other areas, so that the fixing piece 11 may not be moved, in the process of driving the dial gauge to be rotated by rotation of the axis (namely the rotation of the adjustment axis and the reference axis) of the compressor unit, the high-pressure pump, and the generator unit, components such as the bracket 1 and the installation box 6 may also be rotated, since the fixing piece 11 may not be moved, the connecting rope 10 may be released from the outer wall of the rolling rod 15, so that the rolling rod 15 may drive the cam 12 to be rotated, the cam 12 enters the open slot 71, and the convex block is inserted into the groove 13, which is used to limit rotation of the cam 12; and the adjustment axis and the reference axis are continuously rotated, so that the cam 12 is continuously rotated, and the convex block is removed from the groove 13, in the process of continuously rotating the cam, the convex block may be inserted into the groove 13 again, which is used to limit the rotation of the cam 12, as to achieve a marking effect (when the convex block is located in the groove 13, it is a numerical value that the dial gauge needs to measure, as shown in FIG. 6, it refers to parameter numerical values corresponding to points $a_1$, $a_2$, $a_3$, $a_4$, $b_1$, $b_2$, $b_3$, and $b_4$), and by limiting the cam 12, the measurement process may not be misaligned, and the accuracy of the parameters obtained is guaranteed, so that measurement results are more accurate.

In this embodiment, as a further optimized scheme, please refer to FIG. 3, the open slot 71 is internally provided with a touch switch, and the cam 12 is provided with an indicator light 14 (light emitting diode (LED) light), and the indicator light 14 is electrically connected with the touch switch by a wire; and when the convex block enters the groove 13, the convex block may press the touch switch, so that the indicator light 14 is lighted up, as to achieve a prompting effect, and by observing whether the indicator light 14 is lighted up, it is determined whether the position is accurate when the parameters are obtained, as to guarantee the accuracy of the parameters obtained.

Figure 5:
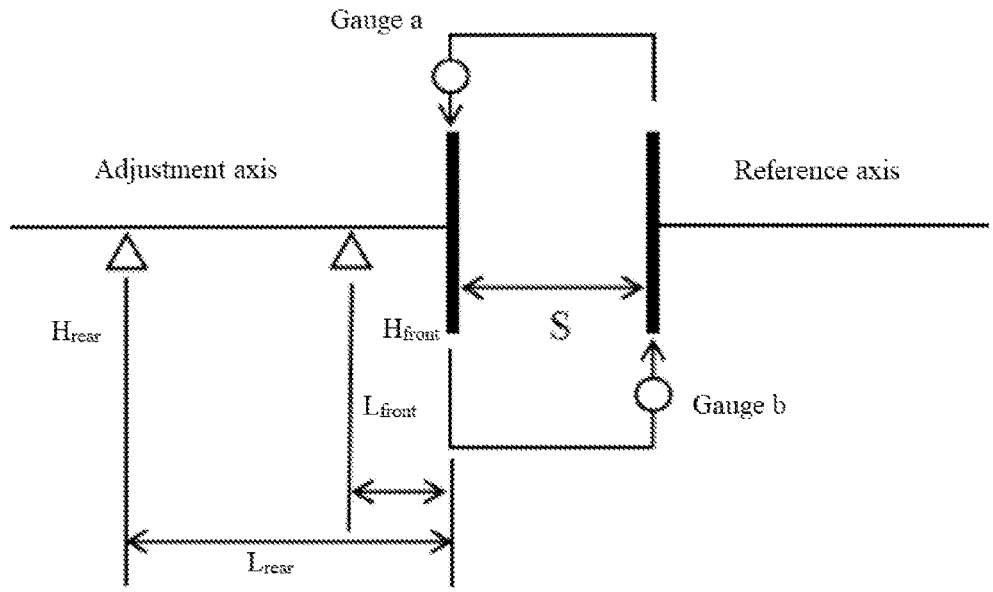
FIG. 5 is a measurement schematic diagram of an adjustment axis and a reference axis of the present application.

In this embodiment, as a further optimized scheme, please refer to FIG. 5, the connecting rope 10 is provided with an expansion rod 16, one end, away from the connecting rope 10, of the expansion rod 16 is connected with the fixing piece 11, the connecting rope 10 is provided with a fixing mechanism, and the fixing mechanism is a mechanism used to fix the expansion rod 16 on the connecting rope 10 (the fixing mechanism refers to a fixing belt or other mechanisms that may fix the expansion rod 16). By moving the expansion rod 16, the position of the fixing piece 11 is changed, and in the process of connecting the fixing piece 11 to the installation area, the connecting rope 10 may not be released from the outer wall of the rolling rod 15, thus it is ensured that the rolling rod 15 and the cam 12 may not be rotated firstly before detection.

Figure 2:
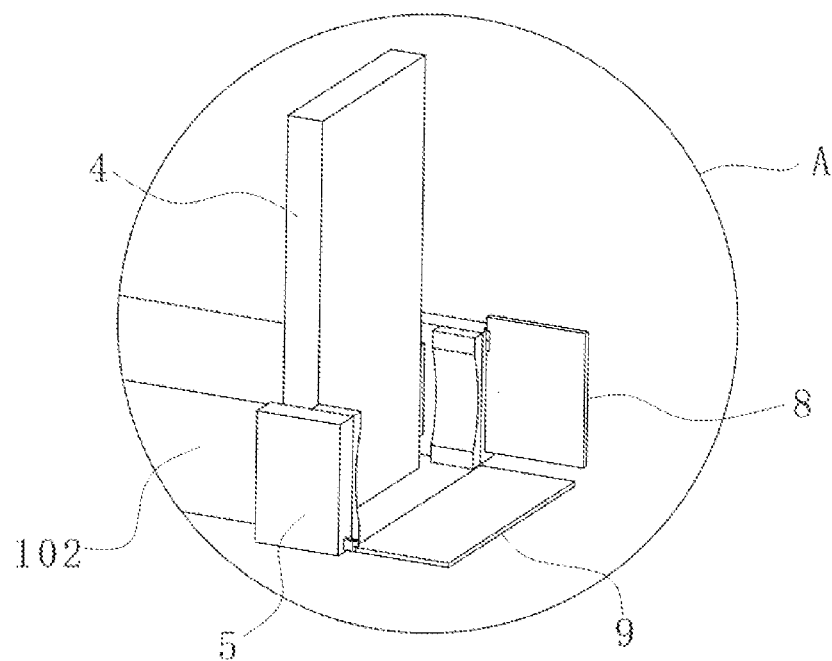
FIG. 2 is an enlarged structure schematic diagram of a portion A of the present application.

In this embodiment, as a further optimized scheme, please refer to FIGS. 1 and 2, the fixture 5 is provided with a first lens 8 and a second lens 9; an image on a dial plate of the dial gauge is mapped onto the first lens 8 and the second lens 9 for easy reading of the parameters on the dial gauge; and both the first lens 8 and the second lens 9 are movably installed on the fixture 5, so that the angles of the first lens 8 and the second lens 9 may be adjusted.

In this embodiment, as a further optimized scheme, please refer to FIG. 1, the bracket 1 includes a support rod 101 and a movable rod 102; an end portion of the support rod 101 is provided with an installation hole, the movable rod 102 is slidably inserted into the installation hole, the support rod 101 is provided with a bolt, and a fastening end of the bolt is attached to an outer wall of the movable rod 102, which is used to fix the movable rod 102; and the bolt is loosened, and the movable rod 102 is moved, so that the length of the bracket 1 may be adjusted according to needs.

In this embodiment, as a further optimized scheme, please refer to FIG. 1, the connecting piece 2 includes two groups of installation blocks; the two groups of the installation blocks are mutually clamped, and the bracket 1 is thread-connected with a screw rod 3 connected with one group of the installation blocks; and by rotating the screw rod 3, a distance between the connecting piece 2 and the bracket 1 may be adjusted, as to ensure that the connecting piece 2 may be installed on the axis of the compressor unit, the high-pressure pump, and the generator unit.

Figure 8:
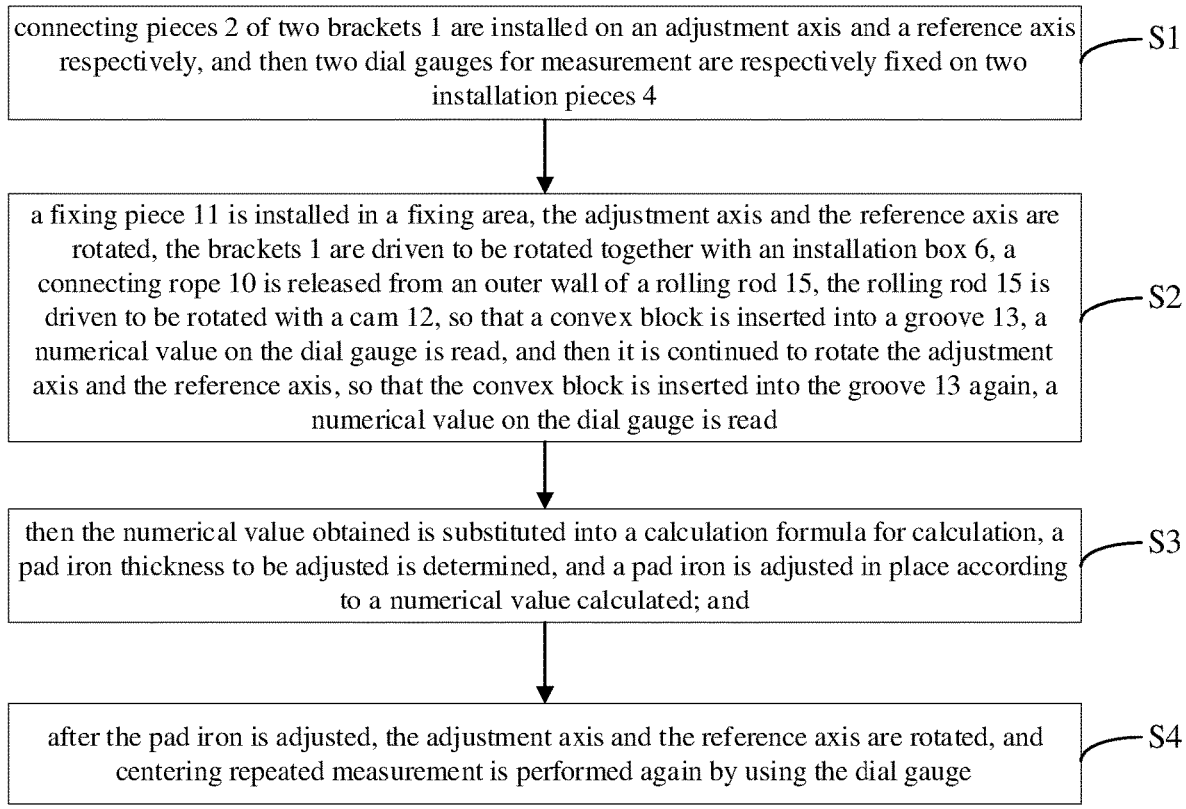
FIG. 8 is a calculation method for compressor unit single meter alignment pad iron adjustment uses the installation mechanism for compressor unit single meter alignment pad iron adjustment of the present application.

As shown in FIG. 8, a calculation method for compressor unit single meter alignment pad iron adjustment uses the installation mechanism for compressor unit single meter alignment pad iron adjustment, and the calculation method specifically includes the following steps.

S1: connecting pieces 2 of two brackets 1 are installed on an adjustment axis and a reference axis respectively, and then two dial gauges for measurement are respectively fixed on two installation pieces 4;

S2: a fixing piece 11 is installed in a fixing area, the adjustment axis and the reference axis are rotated, the brackets 1 are driven to be rotated together with an installation box 6, a connecting rope 10 is released from an outer wall of a rolling rod 15, the rolling rod 15 is driven to be rotated with a cam 12, so that a convex block is inserted into a groove 13, a numerical value on the dial gauge is read, and then it is continued to rotate the adjustment axis and the reference axis, so that the convex block is inserted into the groove 13 again, a numerical value on the dial gauge is read;

S3: then the numerical value obtained is substituted into a calculation formula for calculation, a pad iron thickness to be adjusted is determined, and a pad iron is adjusted in place according to a numerical value calculated; and S4: after the pad iron is adjusted, the adjustment axis and the reference axis are rotated, and centering repeated measurement is performed again by using the dial gauge.

Figure 7:
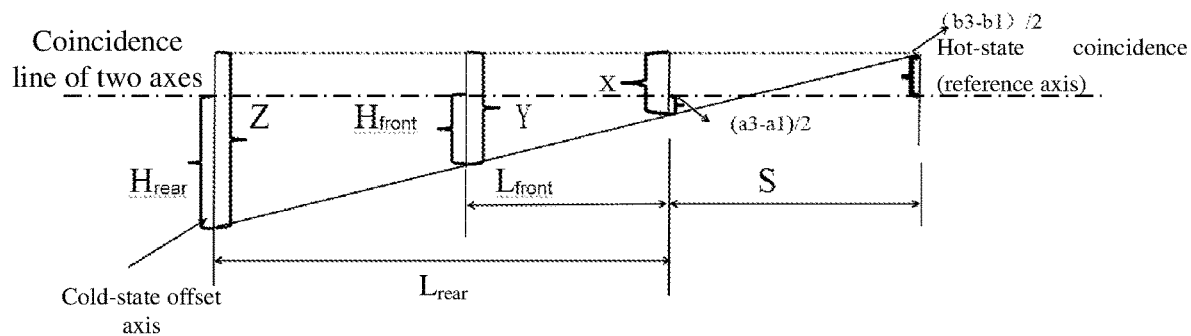
FIG. 7 is a schematic diagram of a cold-state offset axis of the present application.

Please refer to FIGS. 5 and 6, in the single meter alignment process, S, $L_{front}$, $L_{rear}$, and deviation values measured by the dial gauge are all known numbers, assumed values of $H_{front}$ and $H_{rear}$ are required, and target values A and B are both zero, as shown in FIG. 7:

$$X=(a_3-a_1+b_3-b_1)/2$$

After a value of X is obtained, values of Y, Z, and $H_{front}$ may be obtained according to the principle of similar triangles.

$$\frac{X}{Y} = \frac{S}{S + Lfront} \quad X = (a_3 - a_1 + b_3 - b_1)/2$$

Therefore, the following conclusion may be obtained:

$$Y = \frac{(a_3 - a_1 + b_3 - b_1)*(S + Lfront)}{2S}$$

Similarly, it may be concluded that:

$$Z = \frac{(a_3 - a_1 + b_3 - b_1)*(S + Lrear)}{2S}$$

So $H_{front}+(b_3-b_1)/2=Y$ (Y is already calculated above, $$Y = \frac{(a_3 - a_1 + b_3 - b_1)*(S + Lfront)}{2S})$$

$$Hfront = \frac{(a_3 - a_1 + b_3 - b_1)*(S + Lfront)}{2S} - \frac{b_3 - b_1}{2}$$

Similarly, it may be concluded that:

$$H_{rear} = \frac{(a_3 - a_1 + b_3 - b_1)*(S + L_{rear})}{2S} - \frac{b_3 - b_1}{2}$$

After calculation, results are obtained, if $H_{front}<0$, the calculation result is directly added to the pad iron, and if $H_{front}<0$, the pad iron thickness is subtracted from the calculation result. The same way is performed for $H_{rear}$, but the pad iron should be adjusted simultaneously after $H_{front}$ and $H_{rear}$ are calculated together, and the centering repeated measurement (the reference axis and the adjustment axis are rotated, and the dial gauge is used for testing) is performed again after adjustment.

Herein, $H_{front}$ is a front anchor bolt of the adjustment axis; $H_{rear}$ is a rear anchor bolt of the adjustment axis; $L_{front}$ is a distance from an end face of the adjustment axis to a center of the front anchor bolt; $L_{rear}$ is a distance from the end face of the adjustment axis to a center of the rear anchor bolt; S is a distance between the two axes, and is a set value; and gauge a and gauge b represent the dial gauges used for bidirectional measurement respectively.

Although the embodiments of the present application are shown and described already, it may be understood by those of ordinary skill in the art that a plurality of changes, modifications, replacements, and variations may be made to these embodiments without departing from the principles and spirit of the present application, and the scope of the present application is limited by the appended claims and equivalents thereof

What is claimed is:

1. An installation mechanism for compressor unit single meter alignment pad iron adjustment, comprising: a bracket and a connecting piece installed on the bracket, wherein the installation mechanism further comprises: an installation piece arranged on an end portion of the bracket;

the installation piece is provided with a fixture for fixing a dial gauge; and the bracket is provided with an installation box, the installation box is internally and rotatably provided with a rolling rod, the rolling rod is winded with a connecting rope, one end, away from the rolling rod, of the connecting rope is provided with a fixing piece, the installation box is rotatably provided with a cam, one end of the rolling rod extends to an outer side of the installation box and is connected with the cam, the cam is provided with a groove, the installation box is provided with a limiting piece, one side, towards the cam, of the limiting piece is provided with an open slot, and the open slot is internally provided with a convex block for inserting into the groove.

2. The installation mechanism for compressor unit single meter alignment pad iron adjustment according to claim 1, wherein the open slot is internally provided with a touch switch, and the cam is provided with an indicator light electrically connected with the touch switch.

3. The installation mechanism for compressor unit single meter alignment pad iron adjustment according to claim 1, wherein the connecting rope is provided with an expansion rod, one end, away from the connecting rope, of the expansion rod is connected with the fixing piece, and the connecting rope is provided with a fixing mechanism for fixing the expansion rod.

4. The installation mechanism for compressor unit single meter alignment pad iron adjustment according to claim 1, wherein the fixture is provided with a first lens and a second lens.

5. The installation mechanism for compressor unit single meter alignment pad iron adjustment according to claim 1, wherein the bracket comprises a support rod and a movable rod; and an end portion of the support rod is provided with an installation hole, the movable rod is slidably inserted into the installation hole, and the support rod is provided with a bolt for fixing the movable rod.

6. The installation mechanism for compressor unit single meter alignment pad iron adjustment according to claim 1, wherein the connecting piece comprises two groups of installation blocks; and the two groups of the installation blocks are mutually clamped, and the bracket is thread-connected with a screw rod connected with one group of the installation blocks.

\* \* \* \* \*